United States Patent
Cole et al.

(10) Patent No.: US 9,013,426 B2
(45) Date of Patent: Apr. 21, 2015

(54) PROVIDING A SENSE OF TOUCH IN A MOBILE DEVICE USING VIBRATION

(75) Inventors: Alan G. Cole, Katonah, NY (US); Siddique A. Mohammed, Bangalore, IN (US); Dhandapani Shanmugam, Bangalore, IN (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/458,498

(22) Filed: Apr. 27, 2012

(65) Prior Publication Data

US 2013/0181913 A1 Jul. 18, 2013

Related U.S. Application Data

(60) Provisional application No. 61/585,757, filed on Jan. 12, 2012.

(51) Int. Cl.
*G06F 3/041* (2006.01)
*G09G 5/10* (2006.01)
*G06F 3/01* (2006.01)

(52) U.S. Cl.
CPC ...................................... *G06F 3/016* (2013.01)

(58) Field of Classification Search
CPC ... G06F 3/016; G06F 3/041; G06F 2203/014; G06F 3/011; G06F 3/0338; H04L 69/329
See application file for complete search history.

(56) References Cited

U.S. PATENT DOCUMENTS

| | | | |
|---|---|---|---|
| 6,160,489 A | 12/2000 | Perry et al. | |
| 6,448,977 B1 | 9/2002 | Braun et al. | |
| 7,202,837 B2 | 4/2007 | Ihara | |
| 7,269,573 B1 | 9/2007 | Bunn et al. | |
| 2002/0191011 A1 | 12/2002 | Rasouli | |
| 2004/0174374 A1 | 9/2004 | Ihara | |
| 2006/0279537 A1 | 12/2006 | Kim et al. | |
| 2009/0102805 A1 | 4/2009 | Meijer et al. | |
| 2009/0251421 A1 | 10/2009 | Bloebaum | |
| 2010/0020036 A1 | 1/2010 | Hui et al. | |
| 2010/0231367 A1* | 9/2010 | Cruz-Hernandez et al. | ............... 340/407.2 |
| 2010/0231508 A1* | 9/2010 | Cruz-Hernandez et al. | .. 345/156 |
| 2011/0248916 A1 | 10/2011 | Griffin et al. | |

OTHER PUBLICATIONS

PCT search report dated Apr. 18, 2013 regarding application PCT/US2013/020752, filing date Jan. 9, 2013, applicant reference YOR920120006, applicant International Business Machines Corporation, 15 pages.

International Preliminary Report on Patentability and Written Opinion dated Jul. 15, 2014, regarding application No. PCT/US2013/020752, 9 pages.

* cited by examiner

*Primary Examiner* — Michael Faragalla
(74) *Attorney, Agent, or Firm* — Yee & Associates, P.C.; Anne Dougherty

(57) ABSTRACT

Controlling haptic feedback in a mobile communication device is provided. Metadata associated with a set of objects within requested content is parsed to identify each object within the requested content having an associated frequency pattern included in the metadata. The requested content is displayed in a display device. A touch input is received on the display device at a location of an identified object that has an associated frequency pattern within the requested content. A frequency and a duration of a vibration generated by a variable frequency vibration device simulating a tactile texture of the identified object touched within the requested content is controlled using the associated frequency pattern of the identified object.

17 Claims, 6 Drawing Sheets

PROVIDING A SENSE OF TOUCH IN A MOBILE DEVICE USING VIBRATION

The present application claims priority to U.S. Patent Application No. 61/585,757 entitled "SYSTEM AND METHOD OF REALIZING THE SENSE OF TOUCH IN MOBILE DEVICES BY LEVERAGING VIBRATION" filed on Jan. 12, 2012 and assigned to the assignee of the present application, the details of which are incorporated herein by reference.

BACKGROUND

1. Field

The disclosure relates generally to a method, data processing system, and computer program product for controlling haptic feedback in a mobile communication device using a variable frequency vibration device.

2. Description of the Related Art

With the increasing adoption of mobile communication devices, such as mobile phones and in particular smartphones, mobile commerce is increasing at a rapid pace from year to year. Using mobile phone applications, mobile web sites, or a combination of thereof, users of mobile communication devices are able to utilize online stores and shopping sites to search for, compare, and purchase objects, such as products or items provided by enterprises for purchase, using their mobile communication devices. Using a mobile communication device to purchase objects has some advantages, such as the user may make these purchasing decisions at his or her convenience, at any time, and at any place.

SUMMARY

According to one embodiment of the present invention, a method for controlling haptic feedback is provided. A data processing system parses metadata associated with a set of objects within requested content to identify each object within the requested content having an associated frequency pattern included in the metadata. The data processing system displays the requested content in a display device. The data processing system receives a touch input on the display device at a location of an identified object that has an associated frequency pattern within the requested content. Then, the data processing system controls a frequency and a duration of a vibration generated by a variable frequency vibration device simulating a tactile texture of the identified object touched within the requested content using the associated frequency pattern of the identified object. In other embodiments of the present invention, a data processing system and a computer program product for controlling haptic feedback are provided.

BRIEF DESCRIPTION OF THE SEVERAL VIEWS OF THE DRAWINGS

FIG. 5 is an example of a frequency pattern mapping table in accordance with an illustrative embodiment;

DETAILED DESCRIPTION

Figure 1:
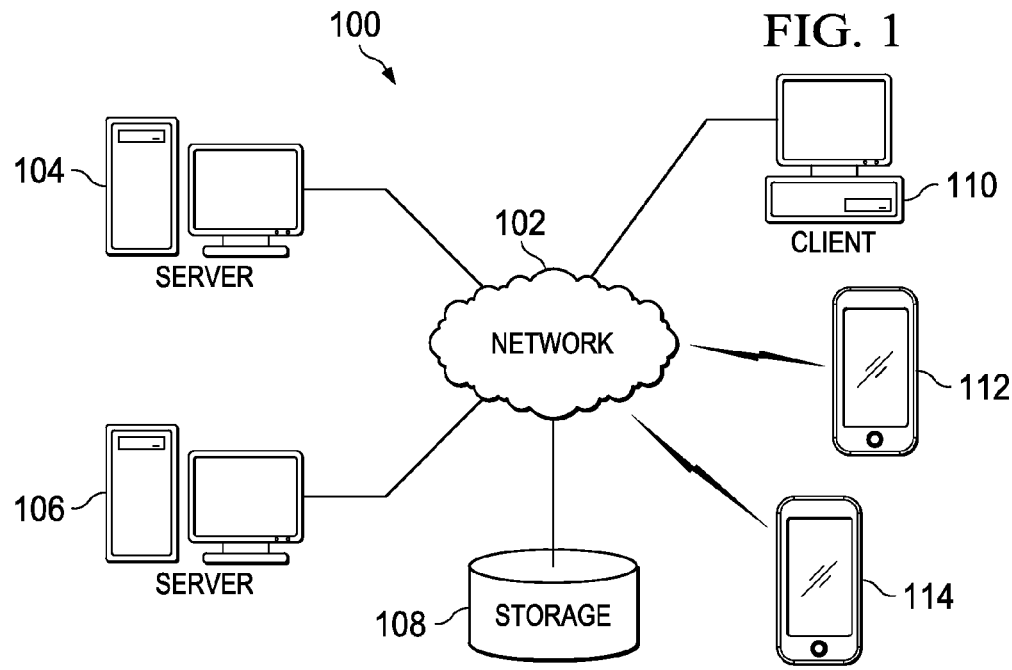
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
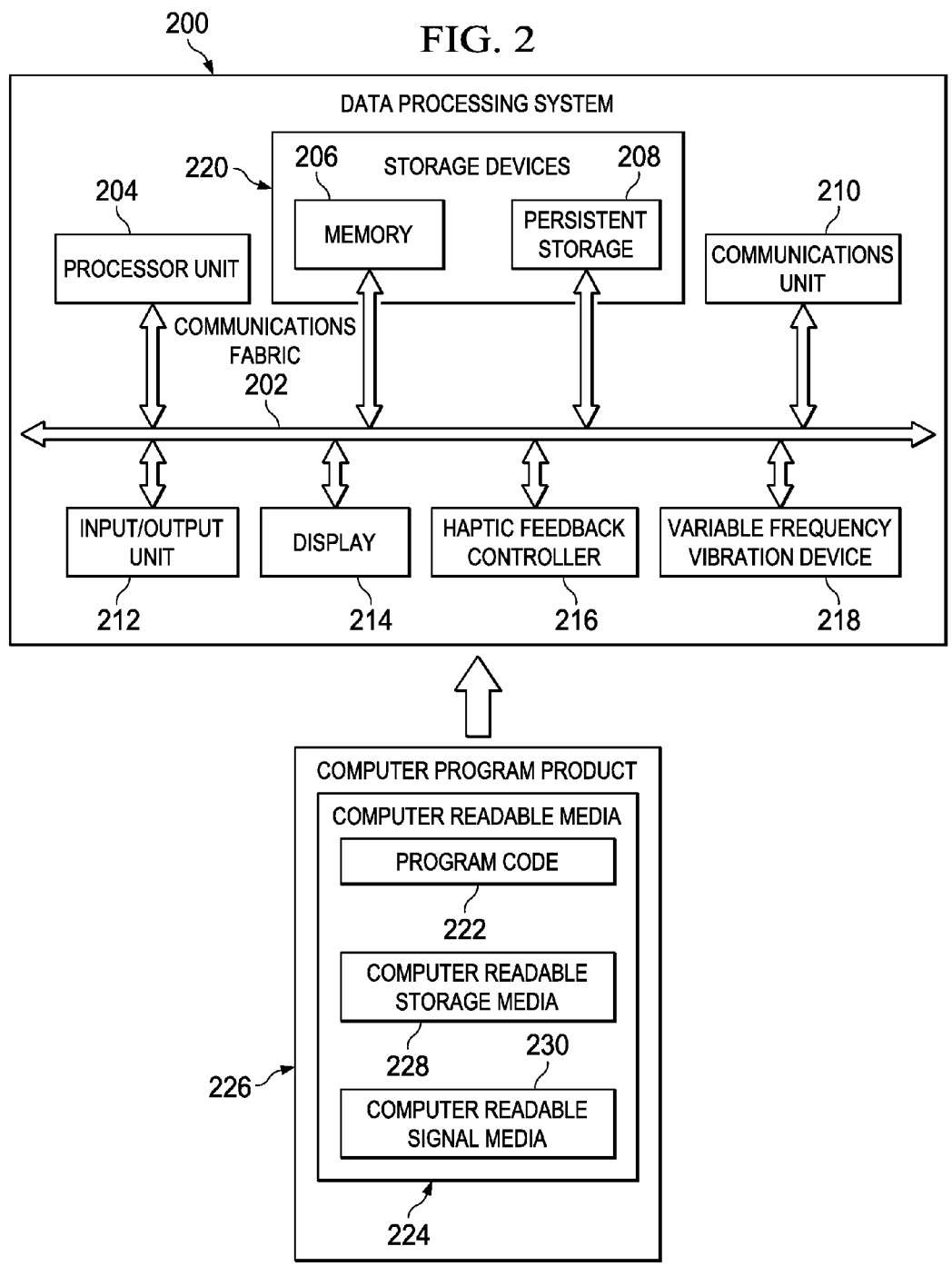
FIG. 2 is a diagram of a data processing system in which illustrative embodiments may be implemented.
Figure 3:
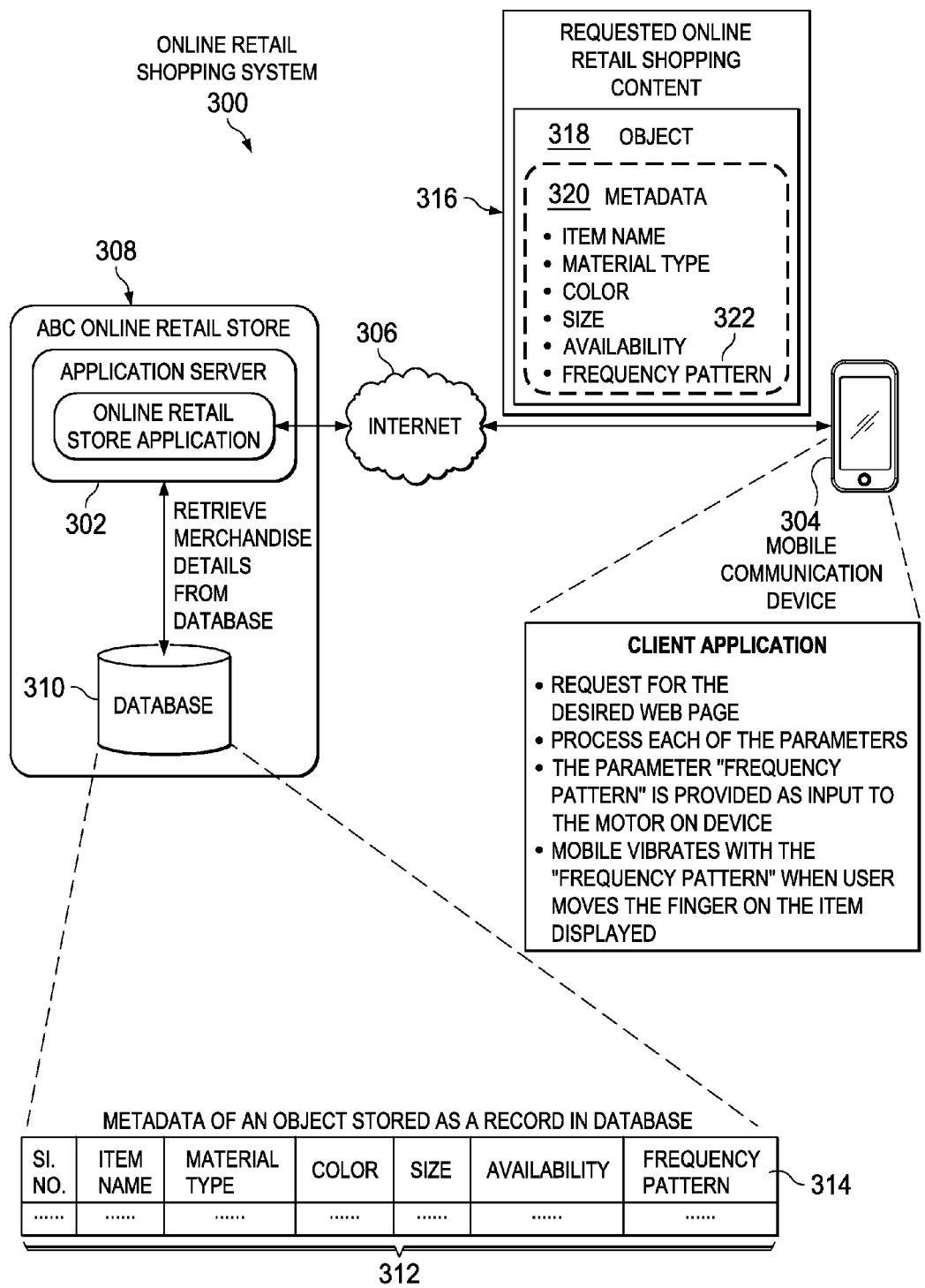
FIG. 3 is a diagram of an online retail shopping system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 may be, for example, a communications server device with high speed connections to network 102. Server 104 may reside, for example, within a cellular telephone service provider network and represent a plurality of servers providing communication services to a plurality of mobile communication devices.

Server 106 may be, for example, a server device associated with an enterprise that provides online shopping services to customers. The enterprise may be, for example, a manufacturer, a wholesaler, or a retailer of objects for sale. An object may be any item, good, product, merchandize, material, or substance that an enterprise may offer for sale. Also, the object may be, for example, manufactured or produced from one or more fabrics, leathers, metals, plastics, rubber products, glass products, wood products, paper products, plant products, rocks, or any combination thereof. Further, server 106 may also represent a plurality of server devices.

Storage unit 108 is a network storage device capable of storing data in a structured or unstructured format. Storage unit 108 may be, for example, a network storage device that provides storage for a set of one or more catalogs of objects for sale by one or more enterprises. In addition, storage unit 108 may also store metadata associated with the objects listed in the set of catalogs. The metadata includes specific information about each particular object listed in the set of catalogs. Further, it should be noted that storage unit 108 may store other data, such as customer information that may include user identification and passwords.

Clients 110, 112, and 114 also connect to network 102. Clients 110, 112, and 114 are clients to server 104 and/or server 106. In the depicted example, server 104 and server 106 may provide information, such as boot files, operating system images, and applications to clients 110, 112, and 114. In this particular example, client 110 is a communication device, such as a personal computer, laptop computer, or network computer, with a physical communication link to network 102. Clients 112 and 114 are mobile communication devices, such as cellular telephones, smartphones, personal digital assistants, or gaming devices, with wireless communication links to network 102. Users may utilize clients 110, 112, and 114 to view, examine, and purchase objects for sale. Furthermore, it should be noted that network data processing system 100 may include any number of additional server devices, client devices, and other devices not shown.

Program code located in network data processing system 100 may be stored on a computer recordable storage medium and downloaded to a computer or other device for use. For example, program code may be stored on a computer recordable storage medium on server 106 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a data processing system, such as client 110 or client 114 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, display 214, haptic feedback controller 216, and variable frequency vibration device 218.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 220. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. Further, display 214 includes touchscreen capabilities. A touchscreen is an electronic visual display that can detect the presence and location of a touch within the display area of display 214. Touching generally refers to contacting display 214 with a finger or hand. The touchscreen capability enables the user to interact directly with what is displayed on display 214.

Haptic feedback controller 216 controls the haptic feedback provided to a user that is touching display 214 over a displayed object that has an associated frequency pattern. Haptic feedback relates to the user's sense of touch and simulates a tactile texture of the displayed object. A tactile texture is a perceived surface quality of an object felt via the sense of touch. A frequency pattern is associated with a particular object and is used to simulate the particular tactile texture of the particular object. The frequency pattern of an object is a variable frequency pattern of vibration that includes a vibration frequency value and a vibration duration value. Haptic feedback controller 216 uses the vibration frequency value and the vibration duration value to control variable frequency vibration device 218. The variable frequency pattern of vibration is a vibration pattern that includes a plurality of variable length segments of variable frequency, which simulate the tactile texture of the particular object. A frequency pattern may simulate a tactile texture of fabric, leather, metal, plastic, rubber, glass, wood, paper, plant, or rock, for example. However, it should be noted that illustrative embodiments may provide a frequency pattern for any type of object or material that has a perceivable surface quality.

It should also be noted that a user of data processing system 200 may enable and disable haptic feedback controller 216 independently of other components, functions, and features of data processing system 200. Furthermore, haptic feedback controller 216 may be implemented entirely as software, hardware, or a combination of software and hardware components.

Variable frequency vibration device 218 may be, for example, a motor or vibrator that is capable of vibrating at variable frequencies based on the vibration frequency value and the vibration duration value data provided by haptic feedback controller 216 as input to variable frequency vibration device 218. Also, variable frequency vibration device 218 may be coupled to a frequency-based accelerometer to measure the vibration frequency output of variable frequency vibration device 218. Variable frequency vibration device 218 vibrates at the variable frequencies to produce the haptic feedback simulating the tactile texture of a set of objects. A set of objects is defined as one or more objects.

Instructions for the operating system, applications, and/or programs may be located in storage devices 220, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 222 is located in a functional form on computer readable media 224 that is selectively removable and may be loaded onto or transferred to data processing system 200 for running by processor unit 204. Program code 222 and computer readable media 224 form computer program product 226. In one example, computer readable media 224 may be computer readable storage media 228 or computer readable signal media 230. Computer readable storage media 228 may include, for example, an optical or magnetic disc that is inserted or placed into a drive or other device that is part of persistent storage 208 for transfer onto a storage device, such as a hard drive, that is part of persistent storage 208. Computer readable storage media 228 also may take the form of a persistent storage, such as a hard drive, a thumb drive, or a flash memory that is connected to data processing system 200. In some instances, computer readable storage media 228 may not be removable from data processing system 200.

Alternatively, program code 222 may be transferred to data processing system 200 using computer readable signal media 230. Computer readable signal media 230 may be, for example, a propagated data signal containing program code 222. For example, computer readable signal media 230 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 222 may be downloaded over a network to persistent storage 208 from another device or data processing system through computer readable signal media 230 for use within data processing system 200. For instance, program code stored in a computer readable storage media in a server data processing system may be downloaded over a network from the server to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 224 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that shopping with a mobile communication device has some shortcomings, such as not being able to examine a physical object by touching or feeling the object prior to purchase. Previously, examining the object by touch could only be accomplished in a retail store or similar physical setting. For example, the feel of a wool sweater is a characteristic that a mobile communication device shopper cannot experience using current technology. Illustrative embodiments address this characteristic by associating a variable frequency pattern of vibration with the physical objects. Then, illustrative embodiments use this variable frequency pattern of vibration to simulate the feeling or texture of an object as haptic feedback to the user of the mobile communication device.

Illustrative embodiments augment the sense of touch on a mobile communication device to simulate the tactile texture of physical objects, especially in the context of an online retail shopping environment. Illustrative embodiments enable a user of a mobile communication device to feel the texture of a given object that is displayed on the mobile communication device. A server associated with an enterprise stores a plurality of objects being offered for sale in a database. In addition, the server associates each object with a variable frequency pattern of vibration, which defines a timing and frequency pattern designed to simulate the tactile texture of the object. When the mobile communication device user moves his or her finger over the image of the displayed object, haptic feedback, as defined by the variable frequency pattern of vibration associated with the object, is provided to the user's finger in the form of a pattern of vibration. The variable frequency pattern of vibration consists of a plurality of variable-length segments of variable frequency.

The database is accessible via the Internet, or via any other communications means, by remote mobile communication devices that may be used to shop in an online store or to access a service of an enterprise. When a particular object is examined on a mobile communication device that utilizes an illustrative embodiment, an associated variable frequency pattern of vibration is communicated from the enterprise's server to the mobile communication device. The mobile communication device then uses the associated variable frequency pattern of vibration to generate haptic feedback, which simulates the tactile texture of the object.

Thus, illustrative embodiments of the present invention provide a method, data processing system, and computer program product for controlling haptic feedback in a mobile communication device. The mobile communication device receives requested online retail shopping content from a server device associated with an enterprise via a network. The enterprise may be, for example, a manufacturer, a wholesaler, or a retailer of objects, such as goods and merchandize, which are offered for sale to customers. The network may be, for example, the Internet. The requested online retail shopping content may be received from the server device in a variety of formats, such as via multimedia messaging or via a Web page.

After receiving the requested online retail shopping content, the mobile communication device determines whether metadata associated with a set of objects is received with the requested online retail shopping content. In response to the mobile communication device determining that metadata associated with a set of objects is received with the requested online retail shopping content, the mobile communication device parses the metadata associated with the set of objects within the requested online retail shopping content. The mobile communication device parses the metadata to identify each object within the requested online retail shopping content having an associated frequency pattern included in the metadata.

The mobile communication device displays the requested online retail shopping content in a display device with touch screen capabilities. In response to the mobile communication device receiving a touch input on the display device at a location of an identified object that has an associated frequency pattern within the requested content, the mobile communication device determines whether a haptic feedback controller is enabled. The haptic feedback controller is located within the mobile communication device and controls a variable frequency vibration device. The variable frequency vibration device is used to simulate the tactile texture of the identified object.

In response to the mobile communication device determining that the haptic feedback controller is enabled, the mobile communication device controls a frequency and a duration of a vibration generated by the variable frequency vibration device, which simulates the tactile texture of the identified object touched within the requested online retail shopping content using the associated frequency pattern of the identified object. The frequency pattern may simulate, for example, a tactile texture of fabric, leather, metal, plastic, rubber, glass, wood, paper, plant, rock, or any other substance or material that has a perceivable surface quality.

Consequently, illustrative embodiments provide a user of a mobile communication device with the capability of feeling the texture of merchandise, such as the "touch" of cloth or leather, by leveraging the vibrator capability of the mobile communication device. As a result, online retail stores can provide an enhanced shopping experience to their online customers. Thus, online retail stores will attract more customers to shop online by providing customers with the ability to feel the merchandise prior to purchase from any part of the world without being physically present within a retail store.

Also it should be noted that illustrative embodiments are not restricted to an online retail shopping environment. In other words, alternative illustrative embodiments may be equally applicable to other environments. For example, a museum might have a collection of artifacts, each of which are characterized by a particular texture or a set of textures. Example artifacts may include sculptures, ancient rugs, stuffed animals, feathers, precious stones, furniture, musical instruments, paintings, or any other artifacts commonly displayed by museums. The alternative illustrative embodiments may be utilized to enhance the experience of an online, virtual visit to a museum by a user utilizing a mobile communication device. It should also be noted that the alternative illustrative embodiments may be implemented within other devices, such as a kiosk or computer with touch screen capabilities or any other associated devices having a capability to vibrate at a variable frequency. The kiosk or computer may be, for example, located within the museum in front of a display enclosed by glass or other structure preventing visitors from touching the actual objects within the display. Each artifact may be described in a server database using various attributes, including a variable frequency pattern of vibration or "vibration pattern." A mobile communication device may access this stored information about an artifact from the server database, which may include not only textual information, a picture, audio, and video about the artifact, but also a vibration pattern that simulates the tactile texture or feel of the artifact. As a result, the mobile communication device may be used by a user to provide further information about the artifacts and to augment displayed information with a vibration pattern simulating the tactile texture or feel of the artifact, as an aid to a physical visit to the museum. Further alternative illustrative embodiments may provide social networking service providers with the human sense of "touch" as part of their capabilities.

With reference now to FIG. 3, a diagram of an online retail shopping system is depicted in accordance with an illustrative embodiment. Online retail shopping system 300 may be implemented in network data processing system 100 in FIG. 1, for example. Online retail shopping system 300 illustrates a typical online retail store environment where online customers can shop. Online retail shopping system 300 includes application server 302, mobile communication device 304, and Internet 306.

In this example, application server 302 is associated with ABC online retail store 308 and provides online shopping services to the customers of ABC online retail store 308. Application server 302 may be, for example, server 106 in FIG. 1. ABC online retail store 308 includes various categories of objects or merchandise for sale to its online customers.

In addition, application server 302 is also associated with database 310. Database 310 may be, for example, storage 108 in FIG. 1. Further, even though database 310 is shown as a separate device in this example, database 310 may be located within application server 302. Database 310 provides storage for a set of one or more catalogs containing a plurality of different objects offered for sale by ABC online retail store 308.

Furthermore, database 310 also stores metadata 312. Metadata 312 is information associated with objects listed in the set of catalogs. In other words, metadata 312 includes specific information about each particular object listed in the set of catalogs. For example, metadata 312 may include information such as object identification number, object name, picture of the object, material type, color, size, price, availability, store location, shipping time, etc. Moreover, metadata 312 includes frequency pattern 314. Frequency pattern 314 is associated with each particular object. Frequency pattern 314 is used to provide a tactile texture of the displayed object using a variable frequency pattern of vibration.

In other words, each object of merchandise stored in database 310 has a unique frequency pattern associated with it which is used to simulate the tactile texture of that particular object. Each object in the inventory of database 310 is associated with a tactile texture by any of a number of means, such as, for example, manual entry of each object tactile texture association into database 310 by a system administrator, computer photographic analysis of each object to automatically determine the tactile texture of an object, utilizing user reports of "crowd sourced" data regarding a tactile texture of an object, or any other suitable means of associating tactile textures with objects. Further, each object in a corresponding physical retail store is tagged with an RFID tag, barcode, or some other type of unique code, from which an object's metadata in database 310 may be identified. Furthermore, each object listed in the set of catalogs is likewise associated with its corresponding metadata from database 310.

A user utilizes mobile communication device 304 to request online retail shopping content 316 from application server 302 via Internet 306. Mobile communication device 304 may be, for example, client 112 in FIG. 1. Internet 306 may be, for example, network 102 in FIG. 1. Mobile communication device 304 then receives requested online retail shopping content 316 from application server 304 via Internet 306. Requested online retail shopping content 316 may be received from application server 302 as a Web page or as multimedia messaging, for example. In this particular example, requested online retail shopping content 316 includes object 318 and metadata 320. However, it should be noted that requested online retail shopping content 316 may include a set of one or more objects, each associated with its own particular set of metadata.

After receiving requested online retail shopping content 316, mobile communication device 304 parses metadata 320 associated with object 318 to identify frequency pattern 322 included in metadata 320. In addition, mobile communication device 304 displays requested online retail shopping content 316 in a display device with touch screen capabilities. The display device may be, for example, display 214 in FIG. 2.

The user of mobile communication device 304 may provide an input to view the details of object 318, such as the size, color, price, availability, shipping time, and picture of object 318. In response to mobile communication device 304 receiving a touch input on the display device at a location of object 318 having associated frequency pattern 322, the mobile communication device determines whether a haptic feedback controller, such as haptic feedback controller 218 in FIG. 2, is enabled. The touch input may be, for example, a finger touch or a hand touch of the user on the display device. Also, it should be noted that frequency pattern 322 is not visible to the user of mobile communication device 304, but is processed by the haptic feedback controller to provide the necessary tactile feedback. The haptic feedback controller controls a variable frequency vibration device, such as variable frequency vibration device 218 in FIG. 2, which is used to simulate the tactile texture of object 318.

In response to mobile communication device 304 determining that the haptic feedback controller is enabled, mobile communication device 304 controls a frequency and a duration of a vibration generated by the variable frequency vibration device, which simulates the tactile texture of object 318 using frequency pattern 322. This variable frequency pattern of vibration defined by frequency pattern 322 is provided as an input to the haptic feedback controller, which invokes an appropriate interface acting upon the motor/vibrator present in mobile communication device 304 to vibrate and provide a feel of the tactile texture of object 318.

Figure 4:
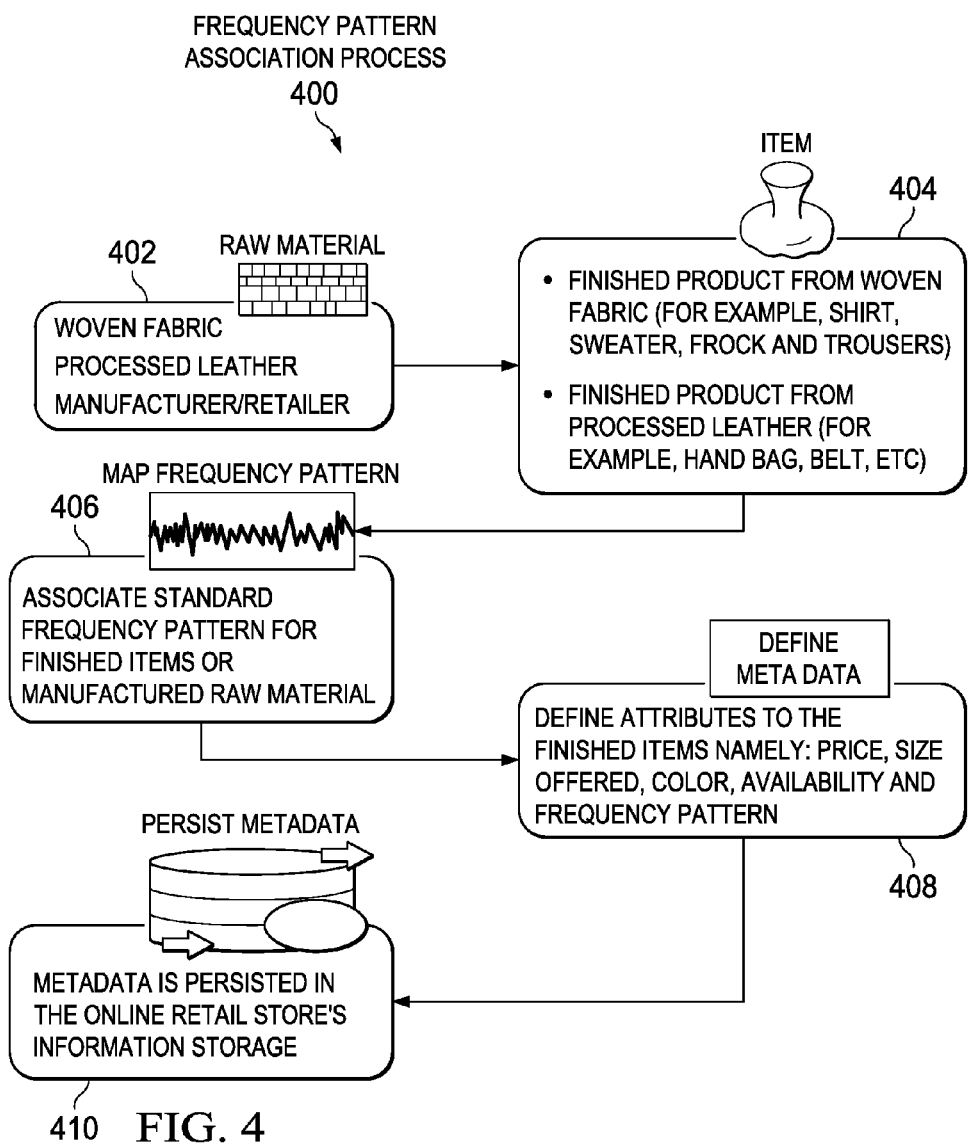
FIG. 4 is a diagram illustrating an example of a frequency pattern association process in accordance with an illustrative embodiment.

With reference now to FIG. 4, a diagram illustrating an example of a frequency pattern association process is depicted in accordance with an illustrative embodiment. Frequency pattern association process 400 illustrates an association of an object with a frequency pattern attribute and storing the frequency pattern attribute in a metadata record within a database, such as database 310 in FIG. 3. The frequency pattern attribute stored in the metadata record may be, for example, frequency pattern 314 stored in metadata 312 in FIG. 3. The frequency pattern is a time varying mathematical function.

Frequency pattern association process 400 includes process steps 402-410. At process step 402, raw material, such as fabric or leather, is processed by an enterprise, such as a manufacturer or retailer. At process step 404, the processed raw material is made into finished products. For example, woven fabric may be made into shirts, sweaters, frocks, or trousers and processed leather may be made into handbags or belts. At process step 406, frequency patterns are associated with the finished products or processed raw materials. The association between the frequency patterns and the finished products may be accomplished, for example, by using a frequency mapping table, which is shown in the example of FIG. 5. Then at process step 408, attributes, such as price, size, color, availability, and frequency pattern, are defined in the metadata record. Finally at process step 410, the metadata record is persisted or stored in the database.

With reference now to FIG. 5, an example of a frequency pattern mapping table is depicted in accordance with an illustrative embodiment. Frequency pattern mapping table 500 illustrates the standardized mapping of an item or object to a texture and a frequency pattern. Frequency pattern mapping table 500 includes item 502, texture 504, and frequency pattern 506.

In this particular example, X1, X2, X3, to Xn represent various merchandise items, such as trousers, shirts, frocks, sweaters, etc., which are available for purchase by customers in an online retail store. Texture values T1, T2, T3, to Tn in texture 504 represent the various tactile textures of the corresponding merchandise items in item 502. The tactile textures may be the feel of cotton, wool, silk, leather, etc., but not limited only to this list. Frequency pattern values f1, f2, f3, to fn in frequency pattern 506 represent the different variable frequency patterns of vibration associated with each of the respective textures listed in texture 504, namely T1, T2, T3, to Tn.

Figure 6:
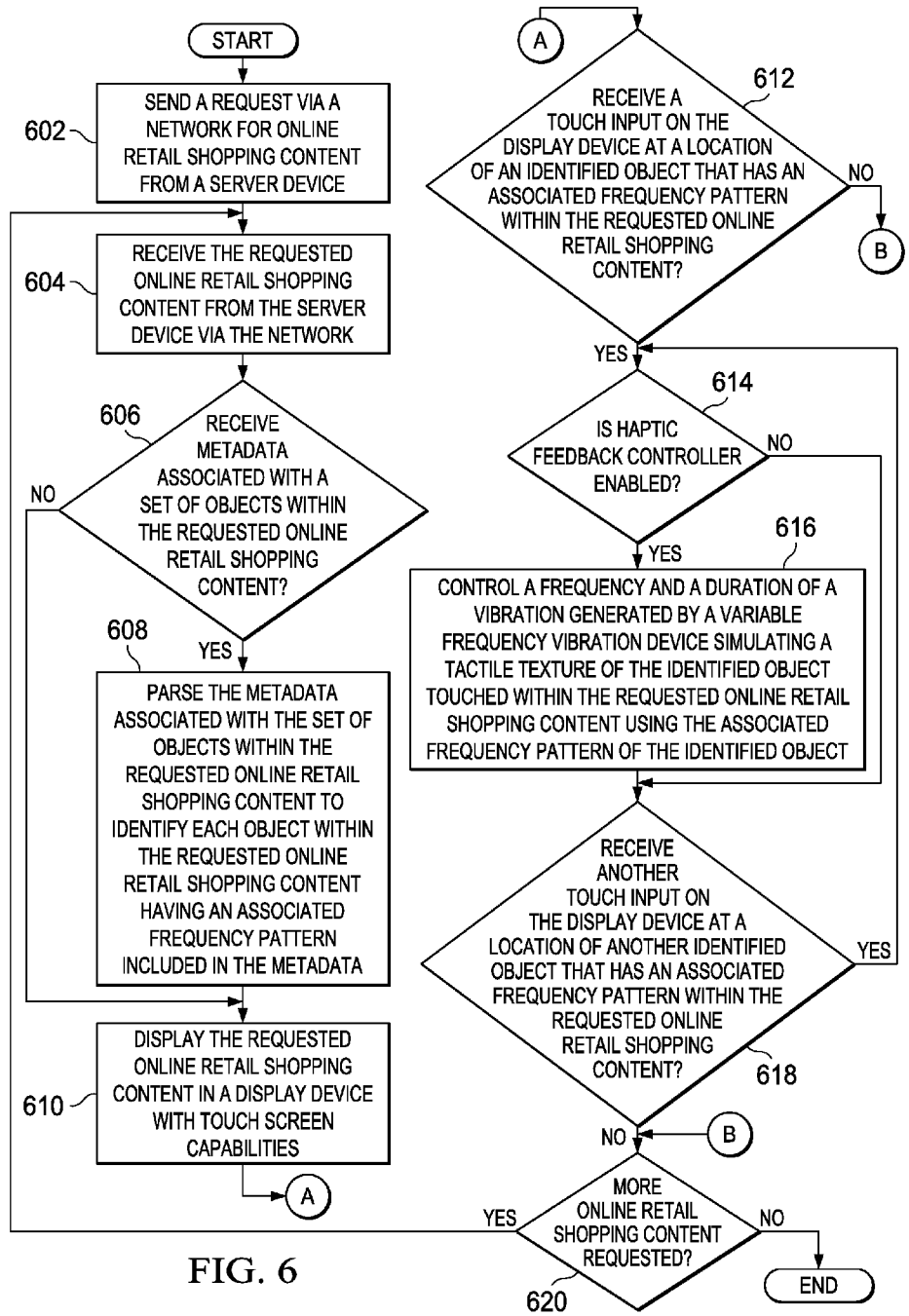
FIG. 6 is a flowchart illustrating a process for controlling haptic feedback in a mobile communication device.

With reference now to FIG. 6, a flowchart illustrating a process for controlling haptic feedback in a mobile communication device is shown in accordance with an illustrative embodiment. The process shown in FIG. 6 may be implemented in a mobile communication device, such as, for example, mobile communication device 304 in FIG. 3.

The process begins when the mobile communication device sends a request via a network, such as Internet 306 in FIG. 3, for online retail shopping content from a server device, such as application server 302 in FIG. 3 (step 602). Subsequently, the mobile communication device receives the requested online retail shopping content, such as requested online retail shopping content 316 in FIG. 3, from the server device via the network (step 604). After receiving the requested online retail shopping content from the server device in step 604, the mobile communication device makes a determination as to whether metadata associated with a set of one or more objects within the requested online retail shopping content is received from the server device with the requested online retail shopping content (step 606). The metadata associated with the set of one or more objects may be, for example, metadata 322 associated with object 318 in FIG. 3.

If the communication device determines that metadata is not associated with the set of objects within the requested online retail shopping content received from the server device, no output of step 606, then the process proceeds to step 610. If the mobile communication device determines that metadata associated with the set of objects within the requested online retail shopping content is received from the server device with the requested online retail shopping content, yes output of step 606, then the mobile communication device parses the metadata associated with the set of objects within the requested online retail shopping content to identify each object within the requested online retail shopping content having an associated frequency pattern included in the metadata (step 608).

Further, the mobile communication device displays the requested online retail shopping content in a display device with touch screen capabilities, such as display 214 in FIG. 2 (step 610). Subsequently, the mobile communication device makes a determination as to whether the mobile communication device receives a touch input on the display device at a location of an identified object that has an associated frequency pattern within the requested online retail shopping content (step 612). If the mobile communication device determines that a touch input is not received on the display device at a location of an identified object that has an associated frequency pattern within the requested online retail shopping content, no output of step 612, then the process proceeds to step 620.

If the mobile communication device determines that a touch input is received on the display device at a location of an identified object that has an associated frequency pattern within the requested online retail shopping content, yes output of step 612, then the mobile communication device makes a determination as to whether a haptic feedback controller located in the mobile communication device is enabled (step 614). The haptic feedback controller may be, for example, haptic feedback controller 216 in FIG. 2. If the mobile communication device determines that the haptic feedback controller is not enabled, no output of step 614, then the process proceeds to step 618. If the mobile communication device determines that the haptic feedback controller is enabled, yes output of step 614, then the mobile communication device controls a frequency and a duration of a vibration generated by a variable frequency vibration device simulating a tactile texture of the identified object touched within the requested online retail shopping content using the associated frequency pattern of the identified object (step 616).

Afterward, the mobile communication device makes a determination as to whether another touch input is received on the display device at a location of another identified object that has an associated frequency pattern within the requested online retail shopping content (step 618). If the mobile communication device determines that another touch input is received on the display device at a location of another identified object that has an associated frequency pattern within the requested online retail shopping content, yes output of step 618, then the process returns to step 614 where the mobile communication device determines whether the haptic feedback controller is enabled. If the mobile communication device determines that another touch input is not received on the display device at a location of another identified object that has an associated frequency pattern within the requested online retail shopping content, no output of step 618, then the mobile communication device makes a determination as to whether more online retail shopping content is requested (step 620).

If the mobile communication device determines that more online retail shopping content was requested, yes output of step 620, then the process returns to step 604 where the mobile communication device receives the requested online retail shopping content from the server device. If the mobile communication device determines that no more online retail shopping content was requested, no output of step 620, then the process terminates thereafter.

Figure 7:
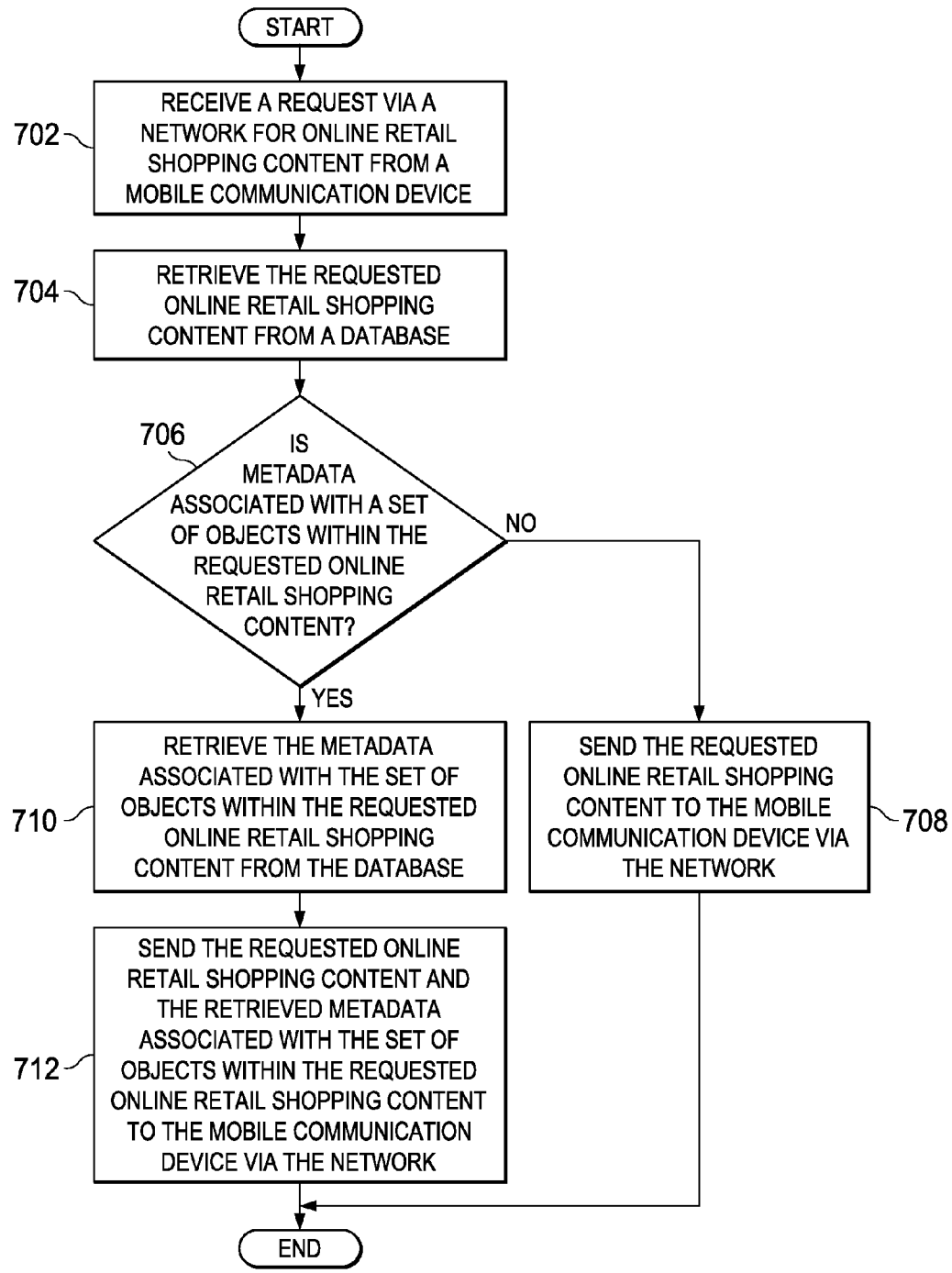
FIG. 7 is a flowchart illustrating a process for retrieving metadata associated with objects within requested online retail shopping content by a server device in accordance with an illustrative embodiment.

With reference now to FIG. 7, a flowchart illustrating a process for retrieving metadata associated with objects within requested online retail shopping content by a server device is shown in accordance with an illustrative embodiment. The process shown in FIG. 7 may be implemented in a server device, such as, for example, application server 302 in FIG. 3.

The process begins when the server device receives a request via a network, such as Internet 306 in FIG. 3, for online retail shopping content from a mobile communication device, such as mobile communication device 304 in FIG. 3 (step 702). After receiving the request for the online retail shopping content from the mobile communication device in step 702, the server device retrieves the requested online retail shopping content from a database, such as database 310 in FIG. 3 (step 704). In addition, the server device makes a determination as to whether metadata is associated with a set of objects within the requested online retail shopping content (step 706).

If the server device determines that metadata is not associated with the set of objects within the requested online retail shopping content, no output of step 706, then the server device sends the requested online retail shopping content to the mobile communication device via the network (step 708). If the server device determines that metadata is associated with the set of objects within the requested online retail shopping content, yes output of step 706, then the server device retrieves the metadata associated with the set of objects within the requested online retail shopping content from the database (step 710). Afterward, the server device sends the requested online retail shopping content and the retrieved metadata associated with the set of objects within the requested online retail shopping content, such as metadata 322 associated with object 318 within requested online shopping content 316 in FIG. 3, to the mobile communication device via the network (step 712). The process terminates thereafter.

Thus, illustrative embodiments of the present invention provide a computer implemented method, data processing system, and computer program product for controlling haptic feedback in a mobile communication device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling haptic feedback, the method comprising:
receiving, by a data processing system, requested content and metadata including frequency patterns associated with one or more objects of a set of objects within the requested content from a server device via a network;
parsing, by the data processing system, the metadata associated with the set of objects within the requested content to identify each object within the requested content having an associated frequency pattern included in the metadata received from the server device;
displaying, by the data processing system, the requested content in a display device;
receiving, by the data processing system, a touch input on the display device at a location of an identified object that has an associated frequency pattern within the requested content; and
controlling, by the data processing system, a frequency and a duration of a vibration generated by a variable frequency vibration device simulating a tactile texture of the identified object touched within the requested content using the associated frequency pattern of the identified object.

2. The method of claim 1 further comprising:
    determining, by the data processing system, whether a haptic feedback controller located in the data processing system is enabled or disabled, wherein the haptic feedback controller controls the variable frequency vibration device that simulates the tactile texture of the identified object;
    responsive to the data processing system determining that the haptic feedback controller is enabled, controlling, by the data processing system, the frequency and the duration of the vibration generated by the variable frequency vibration device simulating the tactile texture of the identified object touched within the requested content using the associated frequency pattern of the identified object; and
    responsive to the data processing system determining that the haptic feedback controller is disabled, bypassing, by the data processing system, control of the variable frequency vibration device to not simulate the tactile texture of the identified object touched within the requested content.

3. The method of claim 1, wherein the associated frequency pattern of the identified object is a variable frequency pattern of vibration and includes a vibration frequency value and a vibration duration value used to control the variable frequency vibration device.

4. The method of claim 3, wherein the variable frequency pattern of vibration is a vibration pattern that includes a plurality of variable length segments of variable frequency simulating the tactile texture of the identified object.

5. The method of claim 1, wherein the data processing system is a mobile communication device.

6. The method of claim 1, wherein the display device includes touch screen capabilities.

7. The method of claim 1, wherein the requested content is online retail shopping content.

8. The method of claim 1, wherein the requested content is received from the server device via one of a Web page or a multimedia message.

9. The method of claim 8, wherein the server device associates a particular frequency pattern with a particular object using a frequency pattern mapping table stored in a database associated with the server device.

10. The method of claim 1, wherein the frequency pattern simulates a tactile texture selected from one of fabric, leather, metal, plastic, rubber, glass, wood, paper, plant, and rock.

11. A data processing system for controlling haptic feedback, the data processing system comprising:
    a bus system;
    a storage device connected to bus system, wherein the storage device stores a set of instructions; and
    a processor connected to the bus system, wherein the processor executes the set of instructions to receive requested content and metadata including frequency patterns associated with one or more objects of a set of objects within the requested content from a server device via a network; parse the metadata associated with the set of objects within the requested content to identify each object within the requested content having an associated frequency pattern included in the metadata received from the server device; display the requested content in a display device; receive a touch input on the display device at a location of an identified object that has an associated frequency pattern within the requested content; and control a frequency and a duration of a vibration generated by a variable frequency vibration device simulating a tactile texture of the identified object touched within the requested content using the associated frequency pattern of the identified object.

12. A computer program product stored on a computer readable storage device having computer usable program code embodied thereon that is executable by a data processing system for controlling haptic feedback, the computer program product comprising:
    computer usable program code for receiving requested content and metadata including frequency patterns associated with one or more objects of a set of objects within the requested content from a server device via a network;
    computer usable program code for parsing the metadata associated with the set of objects within the requested content to identify each object within the requested content having an associated frequency pattern included in the metadata received from the server device;
    computer usable program code for displaying the requested content in a display device;
    computer usable program code for receiving a touch input on the display device at a location of an identified object that has an associated frequency pattern within the requested content; and
    computer usable program code for controlling a frequency and a duration of a vibration generated by a variable frequency vibration device simulating a tactile texture of the identified object touched within the requested content using the associated frequency pattern of the identified object.

13. The computer program product of claim 12 further comprising:
    computer usable program code for determining whether a haptic feedback controller located in the data processing system is enabled or disabled, wherein the haptic feedback controller controls the variable frequency vibration device that simulates the tactile texture of the identified object;
    computer usable program code for controlling the frequency and the duration of the vibration generated by the variable frequency vibration device simulating the tactile texture of the identified object touched within the requested content using the associated frequency pattern of the identified object in response to determining that the haptic feedback controller is enabled; and
    computer usable program code for bypassing control of the variable frequency vibration device to not simulate the tactile texture of the identified object touched within the requested content in response to determining that the haptic feedback controller is disabled.

14. The computer program product of claim 12, wherein the associated frequency pattern of the identified object is a variable frequency pattern of vibration and includes a vibration frequency value and a vibration duration value used to control the variable frequency vibration device.

15. The computer program product of claim 14, wherein the variable frequency pattern of vibration is a vibration pattern that includes a plurality of variable length segments of variable frequency simulating the tactile texture of the identified object.

16. The computer program product of claim 12, wherein the requested content is received via one of a Web page or a multimedia message from the server device.

17. The computer program product of claim 12, wherein a particular frequency pattern is associated with a particular object using a frequency pattern mapping table stored in a database associated with the server device.

* * * * *